United States Patent
Le Van Gong et al.

(10) Patent No.: US 10,979,404 B2
(45) Date of Patent: Apr. 13, 2021

(54) SYSTEMS AND METHODS FOR INSPECTING COMMUNICATION WITHIN AN ENCRYPTED SESSION

(71) Applicant: PAYPAL, INC., San Jose, CA (US)

(72) Inventors: Hubert Le Van Gong, San Jose, CA (US); Michael Shiwen Thang, Singapore (SG)

(73) Assignee: PayPal, Inc., San Jose, CA (US)

(*) Notice: Subject to any disclaimer, the term of this patent is extended or adjusted under 35 U.S.C. 154(b) by 279 days.

(21) Appl. No.: 15/940,919

(22) Filed: Mar. 29, 2018

(65) Prior Publication Data

US 2019/0306132 A1    Oct. 3, 2019

(51) Int. Cl.
  *H04L 29/06*    (2006.01)
  *H04L 9/08*     (2006.01)

(52) U.S. Cl.
  CPC ........ *H04L 63/0435* (2013.01); *H04L 9/0819* (2013.01); *H04L 9/0891* (2013.01); *H04L 63/08* (2013.01); *H04L 2463/121* (2013.01)

(58) Field of Classification Search
  CPC . H04L 63/0435; H04L 9/0819; H04L 9/0891; H04L 63/08; H04L 2463/121; H04L 63/06; H04L 9/08; H04L 9/16; H04L 63/068; H04M 9/00
  See application file for complete search history.

(56) References Cited

U.S. PATENT DOCUMENTS

| | | | | |
|---|---|---|---|---|
| 6,996,714 B1* | 2/2006 | Halasz | .................. | H04L 63/061 713/163 |
| 8,908,868 B1* | 12/2014 | Baer | ...................... | H04L 9/083 380/278 |
| 9,967,292 B1* | 5/2018 | Higgins | ................ | G06F 21/606 |
| 2003/0219129 A1* | 11/2003 | Whelan | .................. | H04L 9/0891 380/270 |
| 2005/0160095 A1* | 7/2005 | Dick | .................... | H04L 63/0428 |
| 2005/0193024 A1* | 9/2005 | Beyer | ..................... | G06F 16/20 |
| 2007/0297410 A1* | 12/2007 | Yoon | ................... | H04L 63/0227 370/392 |

(Continued)

OTHER PUBLICATIONS

M. Bierma, A. Brown, T. DeLano, T. M. Kroeger and H. Poston, "Locally Operated Cooperative Key Sharing (LOCKS)," 2017 International Conference on Computing, Networking and Communications (ICNC), Santa Clara, CA, 2017, pp. 356-362. (Year: 2017).*

Y. Jung and E. Festijo, "Securing RTP Packets Using Per-Packet Selective Encryption Scheme for Real-Time Multimedia Applications," 2013 12th IEEE International Conference on Trust, Security and Privacy in Computing and Communications, Melbourne, VIC, 2013, pp. 659-666. doi: 10.1109/TrustCom.2013.80 (Year: 2013).*

(Continued)

*Primary Examiner* — Mahfuzur Rahman
(74) *Attorney, Agent, or Firm* — Haynes and Boone LLP

(57) ABSTRACT

Methods and systems for providing fast random access and/or inspection of records within an encrypted communication session are presented. The encrypted communication session may include encrypted records that were encrypted using rotating encryption keys. A key index is generated for the encrypted communication session. The key index includes the encryption keys used during the encrypted communication session and timestamps associated with the encryption keys. To access a particular record within the encrypted communication session, a particular encryption key is selected from the encryption keys stored in the key index. The particular record is decrypted using the selected encryption key.

20 Claims, 10 Drawing Sheets

(56) References Cited

U.S. PATENT DOCUMENTS

| | | | |
|---|---|---|---|
| 2008/0219445 A1* | 9/2008 | Yato | H04L 63/0428 380/255 |
| 2010/0211787 A1* | 8/2010 | Bukshpun | H04L 9/065 713/170 |
| 2014/0115702 A1* | 4/2014 | Li | H04L 9/3273 726/23 |
| 2017/0169233 A1* | 6/2017 | Hsu | G06F 21/602 |
| 2018/0007038 A1* | 1/2018 | Hsu | H04L 63/0853 |
| 2018/0019869 A1* | 1/2018 | Savage | H04L 9/0833 |
| 2018/0054417 A1* | 2/2018 | Schibuk | H04L 63/0236 |
| 2018/0062854 A1* | 3/2018 | Kancharla | H04L 63/06 |
| 2018/0069695 A1* | 3/2018 | Bowman | H04L 9/0631 |
| 2019/0097798 A1* | 3/2019 | Hunt | G06F 3/0623 |
| 2019/0149320 A1* | 5/2019 | Keselman | G06F 16/248 380/279 |
| 2019/0245687 A1* | 8/2019 | Ja | H04L 9/0891 |

OTHER PUBLICATIONS

Wilson, Judson & Wahby, Riad & Corrigan-Gibbs, Henry & Boneh, Dan & Levis, Philip & Winstein, Keith. (2017). Trust but Verify: Auditing the Secure Internet of Things. 464-474. 10.1145/3081333. 3081342. (Year: 2017).*

Rescorla, Eric, "The Transport Layer Security (TLS) Protocol Version 1.3, draft-ietf-tls-tls13-28", IETF, Mar. 20, 2018, pp. 1-156 [online], [retrieved on Mar. 29, 2018]. Retrieved from the Internet <URL: https://tools.ietf.org/html/draft-ietf-tls-tls13-28>.

Housely et al., "TLS 1.3 Option for Negotiation of Visibility in the Datacenter draft-rhrd-tls-tls13-visibility-01," Internet Draft, Mar. 2, 2018, pp. 1-11 [online], [retrieved on Mar. 29, 2018]. Retrieved from the Internet <URL: https://datatracker.ietf.org/doc/draft-rhrd-tls-tls13-visibility/>.

* cited by examiner

```
{
  "Timestamp": 2018-01-23T15:30:88.168Z,
  "Client" {
    "key" 0x123abc,
    "iv" 0x888def
  },
  "Server" {
    "key" 0x333aac,
    "iv" 0x888def
  }
},
{
  "Timestamp": 2018-01-23T16:00:88.168Z,
  "Client" {
    "key" 0x5201314,
    "iv" 0x3388
  },
  "Server" {
    "key" 0x22222,
    "iv" 0x8888888
  }
},
```

Figure 5

SYSTEMS AND METHODS FOR INSPECTING COMMUNICATION WITHIN AN ENCRYPTED SESSION

BACKGROUND

The present specification generally relates to electronic data security, and more specifically to, inspection of communications within a session encrypted using rotating encryption keys, in various embodiments.

RELATED ART

In today's electronic age, sensitive data is often communicated over an electronic network, such as the Internet. For example, when a user wishes to obtain information related to an online account by accessing a website, the user may, through a web browser, provide authentication information (e.g., a user name and a password, biometric data, etc.) to a web server over the Internet. The web server may also provide data related to the online account to the user's web browser over the Internet. In order to avoid unauthorized access to sensitive information, the communication between the user device and the web server may be encrypted using one or more encryption keys negotiated between the web server and the web browser. Communications between two parties, such as between server and browser, may also be stored in encrypted form. While encrypting communications provides enhanced security, it also increases the complexity in accessing and/or inspecting the communications in the future. Thus, there is a need for efficiently accessing communication within an encrypted session.

BRIEF DESCRIPTION OF THE FIGURES

FIG. 5 illustrates an example key index according to an embodiment of the present disclosure;

Figure 1:
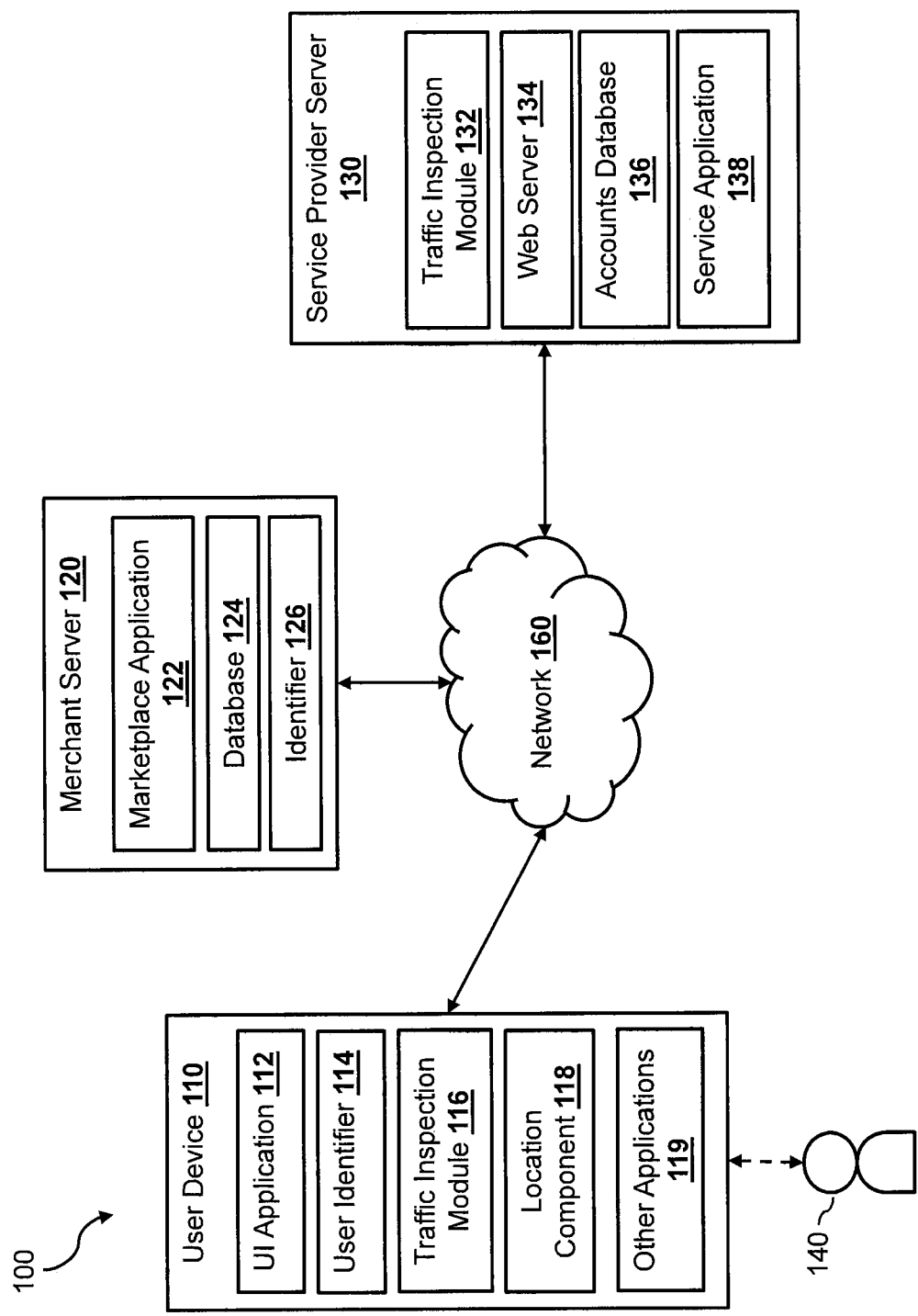
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing fast random access and/or inspection of records or data within an encrypted communication session, according to various embodiments. During an encrypted communication session between two devices, encrypted records or data may be transmitted between the two devices over a period of time. In some embodiments, the two devices may include a server device and a client device (e.g., a web server and a user device executing a web browser, a user device and a developer server, etc.). In other embodiments, the two devices may include two computer devices (e.g. two server devices) within a network that are configured to share information with each other (e.g., a merchant server and a code repository server, a service provider server and a deployment server, etc.). More generally, techniques and structures described herein may apply to any two electronic devices that communicate using encryption. The records or data in a communication session may be encrypted using one or more encryption keys specifically generated for the encrypted session to provide security during the encrypted communication session. To further enhance security, a rotating keys mechanism may be adopted for the encrypted communication session. The rotating keys mechanism provides, in various embodiments, that different encryption keys may be used to encrypt the records or data transmitted between the two devices during different time periods of the session. In particular, each of the two devices may negotiate a key rotation scheme before establishing the encrypted communication session, and each device may use the key rotation scheme to periodically generate new encryption keys throughout the encrypted communication session such that one encryption key may be used for encrypting records or data transmitted-during a first period of time and a different encryption key may be used for encrypting records or data transmitted during a second period of time. Rotation of keys can increase the difficulty for an unauthorized party to breach encryption by ensuring that only limited amounts of records or data are encrypted using particular keys, for example.

To generate a new encryption key, the key rotation scheme may provide a mathematical computation that can be used to compute a new encryption key based at least in part on the previous encryption key. When a key rotation scheme has been negotiated between two devices, each of the two devices may independently compute the same new encryption key based on the previous encryption key.

The initial exchanges (e.g., the handshake) between the two devices before the encrypted communication session is established and records are transmitted during the encrypted communication session may be stored (e.g., as a session file) and subsequently accessed and/or inspected. Since the initial exchanges between the two devices were not encrypted, the initial encryption key(s) for encrypting data transmitted between the devices during a first period of time may be obtained from the initial exchanges. However, as discussed herein, since the encryption keys for encrypting the data may be rotated (changed) over time during the encrypted communication session, one may not be able to access and/or inspect a particular record unless the encryption key that was used to encrypt the particular record is known.

As such, in order to provide fast (e.g., faster than a conventional method or taking less time than a certain time threshold) random access and/or inspection of records within the encrypted communication session, a key index that includes all of the encryption keys used to encrypt records during the session is generated. In some embodiments, the key index may also include information (e.g., timestamps) that indicates the corresponding periods of time during the session when each of the encryption keys is used to encrypt the records.

Different embodiments may use different techniques to generate the key index. Under a live approach, the key index may be generated in real-time during communication between the two devices, as the encryption keys are generated and used. In some embodiments, in response to detecting an indication of an encrypted communication session being initiated between the two devices, such as when the initial exchange (e.g., the handshake) occurs between the two devices, a first encryption key may be obtained based on the initial exchange and stored in the key index. During the encrypted communication session, the communication between the two devices is monitored (which may occur at either device involved in the session, for example, or another monitoring device possessing the necessary encryption information, if desired). When an indication of a key update (e.g., one device transmitting a key update message to the other device) is detected, a timestamp that indicates a time of the key update and a new encryption key may be obtained and stored in the key index. The communication between the two devices continues to be monitored, and any new encryption key(s) and associated timestamp(s) are obtained and stored in the key index until it is detected that the encrypted communication session is terminated, in various embodiments.

Under an offline approach, rather than generating the key index file in real time of the encrypted communication session, a session file (that includes the initial exchange data and the encrypted records) may be parsed to generate the key index. In some embodiments, the session file may be parsed in sequence (e.g., parsed from the beginning of the session file), such that the initial exchanges (not encrypted) between the two devices may be extracted first from the session file. The initial exchanges may then be used to obtain the particular key generation/key rotating scheme negotiated between the two devices and the first encryption key used to encrypt records in the initial period of time during the encrypted communication session. As such, the encrypted records communicated between the two devices during the initial period of the encrypted communication session stored in the session file may be decrypted using the first encryption key. The first encryption key may also be stored in the key index for the encrypted communication session.

The decrypted records are parsed to detect an indication of a key update (e.g., a key update message transmitted between the devices) in some approaches. When a key update is detected within the decrypted records, a timestamp associated with the key update may be obtained from the session file and a new encryption key may be computed based on the obtained key rotating scheme and the previous encryption key. The new encryption key and the timestamp may be appended to the key index for the encrypted communication session. The new encryption key may then be used to decrypt the subsequent encrypted records in the session file until another key update is detected. New encryption keys and timestamps may be continuously or periodically obtained and added to the key index in the same manner as described above until the end of the session file is reached.

Once the key index is generated (under either the live approach or the offline approach), the key index may be associated with the encrypted communication session (e.g., associated with a session identifier of the encrypted communication session). The session file generated from the encrypted communication session and its associated key index may also be stored to be accessed subsequently. A request to access a particular record from the encrypted communication session may be received. In some embodiments, the request may include a timestamp that identifies the particular record among all or some of the records exchanged during the encrypted communication session. Upon receiving such a request, a corresponding encryption key that was used to encrypt the particular record may be retrieved from the key index based on the timestamp. The encrypted record may be extracted from the session file using the timestamp, and decrypted using the corresponding encryption key. In some embodiments, the decrypted record may be displayed, stored, or transmitted to another user device over a network.

FIG. 1 illustrates an electronic transaction system 100 according to one embodiment of the disclosure. The electronic transaction system 100 includes a service provider server 130, a merchant server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to initiate an encrypted communication session with the service provider server 130 by using a web browser to request a log in webpage from the service provider server 130. The user device 110 and the service provider server 130 may then communicate with each other (e.g., exchange encrypted records) during the encrypted communication session where the user 140 may provide authentication information (e.g., a user name and a password, biometric information, etc.) to the service provider server 130 and the service provider server 130 may provide account information and services (e.g., account transfers or payments) to the user 140 via the user device 110. Similarly, a merchant associated with the merchant server 120 may use the merchant server 120 to initiate an encrypted communication session with the service provider server 130, for example, by sending a data request to the service application 138. Once the encrypted communication session is established, the merchant server 120 and the service provider server 130 may then exchange sensitive information (e.g., information the user may not want revealed to unintended or unauthorized users or entities or information that can be used to access an account of the user or create an account in the name of the user) such as authentication data and account information securely. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct transactions (e.g., data communication, shopping, purchasing, bidding, etc.) with the service provider server 130 over the network 160. In one aspect, purchase expenses may be directly and/or automatically debited from an account related to the user 140 via the user interface application 112.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may also include a traffic inspection module 116 configured to perform functionalities as described herein. In some embodiments, the traffic inspection module 116 may generate a key index based on an encrypted communication session. For example, the traffic inspection module 116 may detect an indication that an encrypted communication session is initiated between the user device 110 and the service provider server 130 (e.g., based on an HTTP request from the web browser of the user device 110, etc.). The traffic inspection module 116 may then begin monitoring the communication between the user device 110 and the service provider server 130 to generate the key index using techniques described herein. In another example, the traffic inspection module 116 may parse a session file generated from an encrypted communication session to generate the key index. The traffic inspection module 116 may then access and/or inspect any records within the encrypted communication session for the user device using the generated key index, and display the decrypted record on a display of the user device 110. In some embodiments, the traffic inspection module 116 (or a portion thereof) may reside within the web browser of the user device 110. Note generally that while certain modules may be described as performing particular functions herein, in various embodiments, such functions may be executed by any software or hardware instructions on one or more particular devices.

The user device 110, in various embodiments, may include other applications 119 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 119 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. The user identifier 118 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 114 may be passed with a user login request to the service provider server 130 via the network 160, and the user identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of requests. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. In one example, the location information may be directly entered into the user device 110 by the user via a user input component, such as a keyboard, touch display, and/or voice recognition microphone. In another example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 122, in one embodiment, may include a marketplace application 122, which may be configured to provide information over the network 160 to the user interface application 112 of the user device 110. For example, the user 140 of the user device 110 may interact with the marketplace application 122 through the user interface application 112 over the network 160 to search and view various items available for purchase in the merchant database 124.

The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. The merchant may also have an account with the service provider server 130. Even though only one merchant server 120 is shown in FIG. 1, it has been contemplated that one or more merchant servers (each similar to merchant server 120) may be communicatively coupled with the service provider server 130 and the user device 110 via the network 160 in the system 100.

The service provider server 130, in one embodiment, may be maintained by a transaction processing entity or an online service provider, which may provide processing for electronic transactions between the user 140 of the user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., eBay® of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130 may also include a traffic inspection module 132, which may perform similar functionalities as the traffic inspection module 116. However, instead of residing in a web browser, the traffic inspection module 132 (or at least a portion thereof) may reside in the web server 134. In some embodiments, the traffic inspection module 132 may generate a key index based on an encrypted communication session. For example, the traffic inspection module 132 may detect an indication that an encrypted communication session is initiated between the user device 110 and the service provider server 130 (e.g., based on an HTTP request received by the web server 134 from the web browser of the user device 110, etc.). The traffic inspection module 132 may then begin monitoring the communication between the user device 110 and the service provider server 130 to generate the key index using techniques described herein. In another example, the traffic inspection module 132 may parse a session file generated from an encrypted communication session to generate the key index. The traffic inspection module 132 may then access and/or inspect any records within the encrypted communication session for the user device using the generated key index, and display the decrypted record on a display of the service provider server 130. In some embodiments, the traffic inspection module 132 may transmit the decrypted record to other devices, such as the user device 110, in response to a request for accessing the record.

The service provider server 130, in one embodiment, may be configured to maintain one or more user accounts and merchant accounts in an account database 136, each of which may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account, which may be used by the web server 134 to determine whether to authorize or deny a request associated with the user account. In certain embodiments, account information also includes user purchase profile information such as account funding options and payment options associated with the user, payment information, receipts, and other information collected in response to completed funding and/or payment transactions.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

Figure 2:
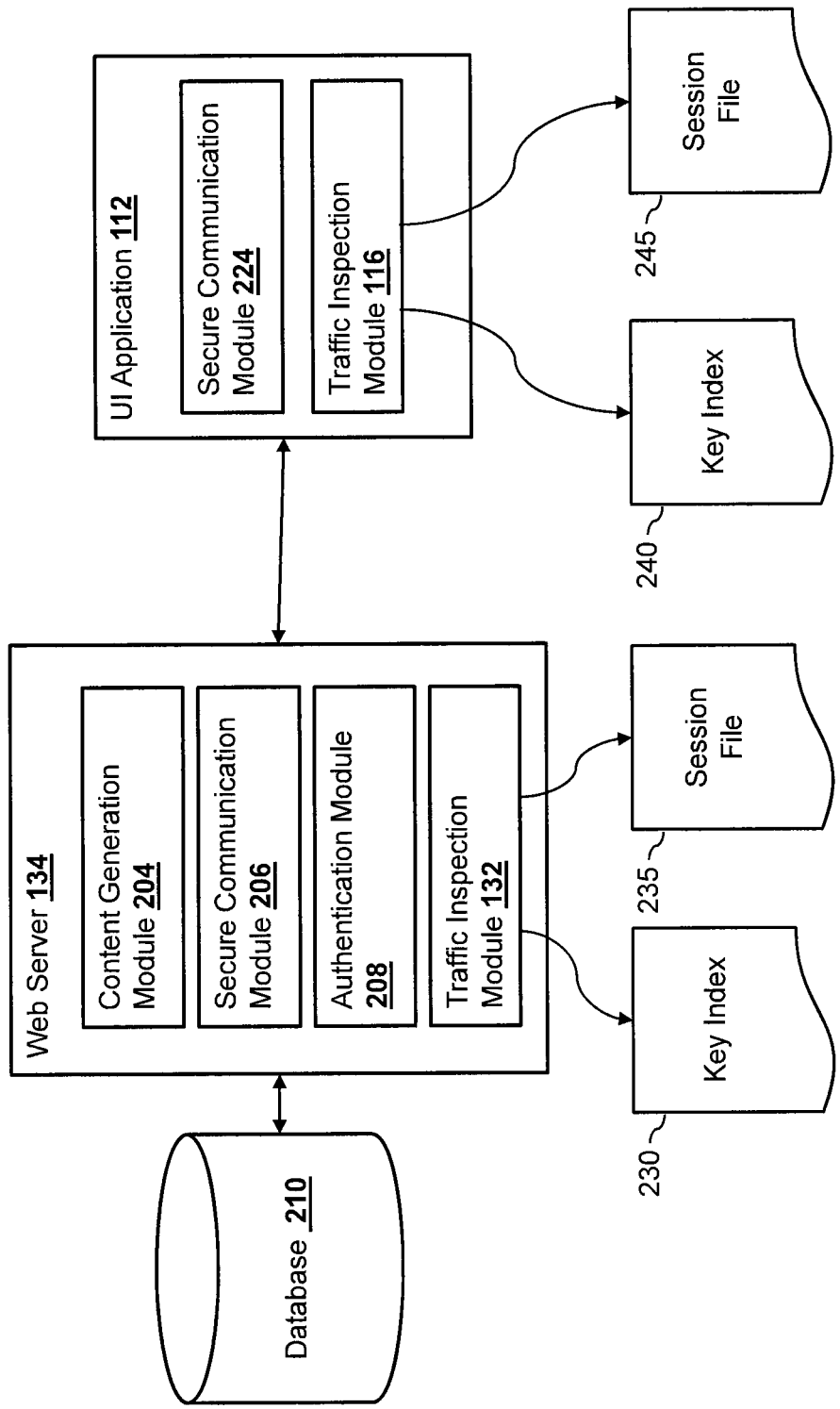
FIG. 2 is a block diagram illustrating a web server and a user interface (UI) application according to an embodiment of the present disclosure.

FIG. 2 illustrates a block diagram of the web server 134 of the service provider server 130 and the UI application 112 of the user device 110 according to an embodiment of the disclosure. As discussed above, the web server 134 may be configured to provide web services to user devices, such as the user device 110 over the network 160. The UI application 112 may be configured to enable a user (e.g., the user 140) to access content and/or services from a remote device (e.g., the service provider server 130) over a network. As shown, the web server 134 is communicatively coupled to a database 210 and may include a content generation module 204, a secure communication module 206, an authentication module 208, and the traffic inspection module 132. The content generation module 204 may be configured to generate content in response to a request, such as a request (e.g., an HTTP request) from the UI application 112 of the user device 110. In some embodiments, the content generation module 204 may generate the content based on data retrieved from the database 210.

The secure communication module 206 may be configured to establish and maintain encrypted communication sessions with other devices, such as the user device 110. For example, the secure communication module 206 may perform initial exchanges (e.g., handshake) with the secure communication module 224 of the UI application 112 to establish an encrypted communication session. The secure communication module 206 may also perform encryption on all of the content (records) being transmitted to the UI application 112. The authentication module 208 may be configured to authenticate a user or a user device based on authentication data received from the UI application 112. As shown, the UI application 112 includes a secure communication module 224 and the traffic inspection module 116.

Figure 3:
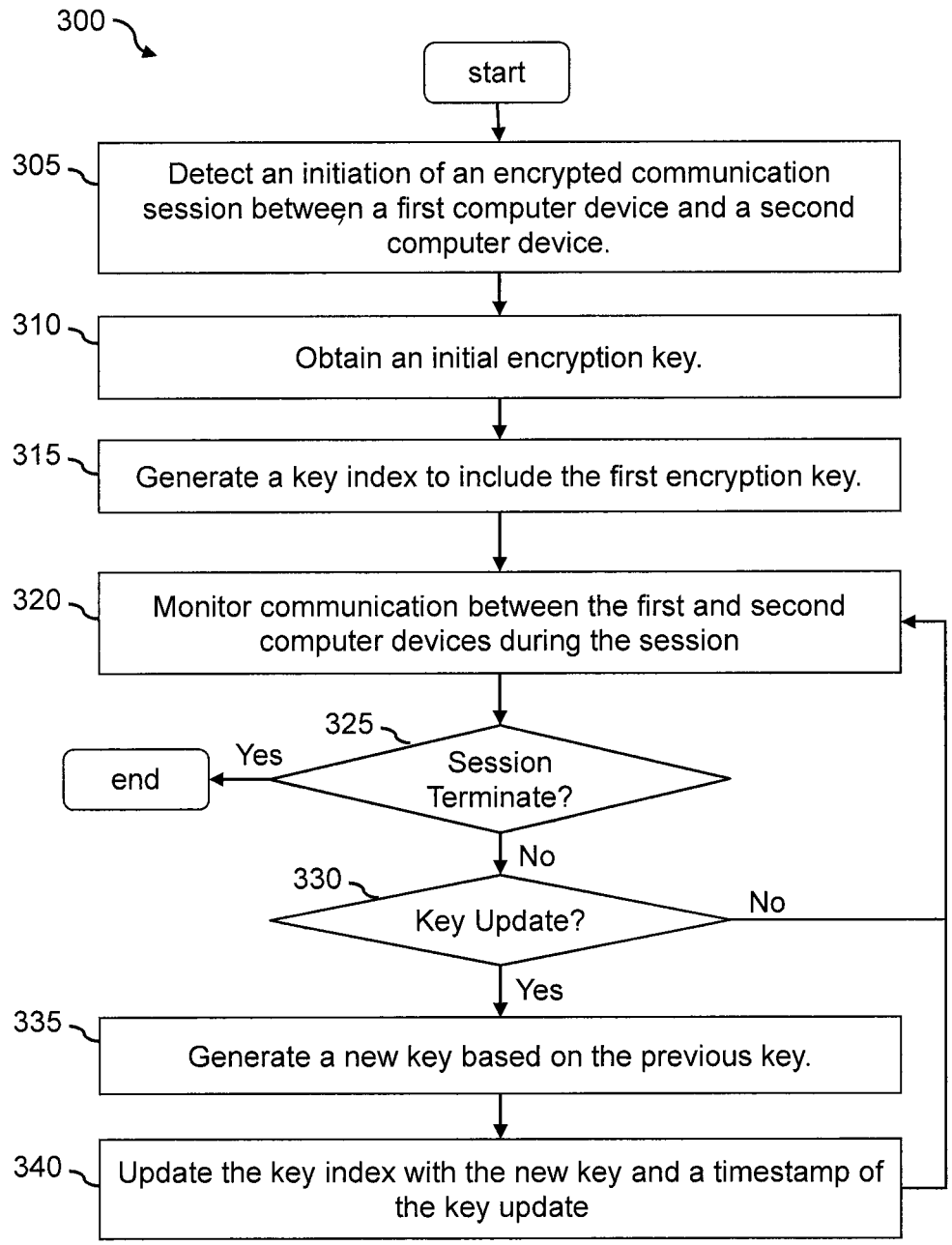
FIG. 3 is a flowchart showing a process relating to generating a key index under a live approach according to an embodiment of the present disclosure.

FIG. 3 illustrates a process 300 for generating a key index under a live approach according to various embodiments of the disclosure. In some embodiments, the process 300 may be performed by the traffic inspection module 132 of the service provider server 130 and/or the traffic inspection module 116 of the user device 110. The process 300 begins by detecting (at step 305) an indication of an encrypted communication session between a first computer device and a second computer device. As discussed above, an encrypted communication session may be initiated between two computer devices to enhance the security of data being transmitted between the two devices. For example, the user 140, via the UI application 112, may transmit a request (e.g., an HTTP request) for content from the web server 134. In some embodiments, the request may comprise an indication to establish an encrypted communication session for exchanging data. For example, the request may include an HTTPS request, which provides the indication to the web server 134 that the UI application 112 intends to communicate with the web server 134 in a secured channel (e.g., via an encrypted communication session). In this example, the traffic inspection module 132 may detect the indication of initiating an encrypted communication session when the traffic inspection module 132 determines that the web server 134 receives an HTTPS request (e.g., the web server 134 may send the indication to the traffic inspection module 132 in response to receiving the HTTPS request). Similarly, the traffic inspection module 116 may detect the indication of initiating an encrypted communication session when the traffic inspection module 116 determines that the UI application 112 sends an HTTPS request to the web server 134 (e.g., the UI application 112 may send the indication to the traffic inspection module 116 in response to sending the HTTPS request).

In response to receiving the request and before providing the content to the UI application 112, the secure communication module 206 of the web server 134 may perform the initial exchange (e.g., the handshake) with the UI application 112 to establish the encrypted communication session. It is noted that different UI applications (e.g., different web browsers) may provide support for establishing a secure communication channel with the web server 134 under different security protocol. For example, the UI application 112 may support one or more versions of the transport layer security (TLS) protocols, which is a successor of secure sockets layer (SSL) protocols for communicating securely via web browsing, instant messaging, voice over IP (VoIP), etc. As such, in some embodiments, the secure communication module 206 may determine the type of application associated with the UI application 112, such as a maker of the UI application and a version number. Based on the type of application associated with the UI application 112, the secure communication module 206 may perform the initial exchange (e.g., the handshake) according to a corresponding secure communication protocol supported by the UI application 112. In one example, the secure communication module 206 may perform the initial exchange with the secure communication module 224 according to a protocol that supports a key rotating scheme.

Upon detecting the indication, the traffic inspection module 132 and/or the traffic inspection module 116 may begin monitoring the communication between the web server 134 and the UI application 112. In some embodiments, the traffic inspection module 132 and/or the traffic inspection module 116 may store information related to the initial exchange in a file, such as a session file (e.g., session file 235 and session file 245, respectively). During the initial exchange (e.g., the handshake), the secure communication module 206 and the secure communication module 224 may negotiate the parameters for establishing the encrypted communication session between the web server 134 and the UI application 112. For example, the secure communication module 206 and the secure communication module 224 may negotiate a particular encryption algorithm, among different encryption algorithms (e.g., AES encryption algorithms, ChaCha20 encryption algorithms, etc.) for encrypting data during the encrypted communication session. In some embodiments, the encryption algorithms used by the secure communication module 206 and the secure communication module 224 may be symmetric encryption algorithms such that the same key is used to encrypt and decrypt the data.

The secure communication module 206 and/or the secure communication module 224 may also generate an initial encryption key. In some embodiments, the initial encryption key may include an initialization vector "IV" value and a key value. An IV value may in some embodiments be a number that is chosen at random and/or is unpredictable. In other embodiments, the initial encryption key may include only a key value. For example, either one of the secure communication module 206 or the secure communication module 224 may generate an initial encryption key, and transmit the initial encryption key to the other one of the secure communication module 206 and the secure communication module 224. In addition, each one of the secure communication module 206 and the secure communication module 224 may encrypt the initial encryption key using a public key of the other one of the secure communication module 206 and the secure communication module 224 before transmitting the encrypted seed to the other one of the secure communication module 206 and the secure communication module 224.

In some embodiments, each of the secure communication module 206 and the secure communication module 224 may encrypt data using a different encryption key. In these embodiments, each of the secure communication module 206 and the secure communication module 224 may generate a corresponding encryption key (an initial server encryption key and an initial client encryption key), and send the corresponding encryption key to the other one of the secure communication module 206 and the secure communication module 224. In some embodiments, each of the initial server encryption key and the initial client encryption key may include an IV value and a key value. The negotiated encryption algorithm may use both of the IV value and the key value to encrypt a record.

In addition, the secure communication module 206 and the secure communication module 224 may negotiate a particular key rotation scheme, among different key rotation schemes, for rotating the encryption keys during the encrypted communication session. In some embodiments, the negotiated key rotation scheme includes an algorithm and/or a mathematical computation that can generate a new encryption key based on another encryption key (e.g., a previous encryption key).

As such, the traffic inspection module 132 and the traffic inspection module 116 may store the negotiated encryption algorithm, the initial encryption key(s), and the negotiated key rotating scheme in the corresponding session files 235 and 245, respectively.

Once the encryption algorithm, the initial encryption key(s), and the key rotating scheme are obtained, the encrypted communication session is established, and the secure communication module 206 and the secure communication module 224 may begin communicating with each other within the encrypted communication session. For example, the secure communication module 206 may encrypt records using the initial server encryption key before sending the encrypted records to the UI application 112. Similarly, the secure communication module 224 may encrypt records using the initial client encryption key before sending the encrypted records to the web server 134.

Furthermore, the secure communication module 206 may use the initial client encryption key and the encryption algorithm to decrypt all incoming records from the UI application 112. Similarly, the secure communication module 224 may use the initial server encryption key received from the web server 134 and the encryption algorithm to decrypt all incoming records from the web server 134.

As used herein, data, a record is a communication transmitted by a computing device, such as one of the web server 134 or the user device 110 via the UI application 112 to the other one of the web server 134 or the user device 110 via the UI application 112. The term record may refer to records as used in the TLS protocol, for example. Note that descriptions discussed herein regarding "records" are not necessarily limited to a particular format however, even though in some embodiments the format of the records may be dictated by the TLS 1.3 protocol. More broadly, a "record" may also be a discrete data transmission portion in some embodiments. Each record is encrypted using the corresponding encryption key. For example, once the content generation module 204 generates content for the UI application 112, the secure communication module 206 may encapsulate the content within a record, encrypt the record using the server encryption key, and transmit the encrypted record to the UI application 112 over the network 160. In some embodiments, the encrypted record may be broken down into smaller data packets (e.g., by the TCP/IP layer of the networking stack) before transmitting to the UI application 112. Similarly, once the UI application 112 generates data to be communicated to the web server 134 (e.g., from a user input received via a user interface of the user device 110), the secure communication module 224 may encapsulate the generated data in a record, encrypt the record using the client encryption key, and transmit the encrypted record to the web server 134. In some embodiments, the encrypted record may be broken down into smaller data packets before transmitting to the web server 134.

Referring back to FIG. 3, the process 300 then obtains (at step 310) the initial encryption keys for the encrypted communication session. For example, the traffic inspection module 132 may obtain the initial server encryption key and the initial client encryption key, and store the initial encryption keys in the key index 230. Similarly, the traffic inspection module 116 may also obtain the initial server encryption key and the initial client encryption key, and store the initial encryption keys in the key index 240. As such, the process 300 generates (at step 315) a key index and includes the initial encryption keys in the key index.

Figure 4:
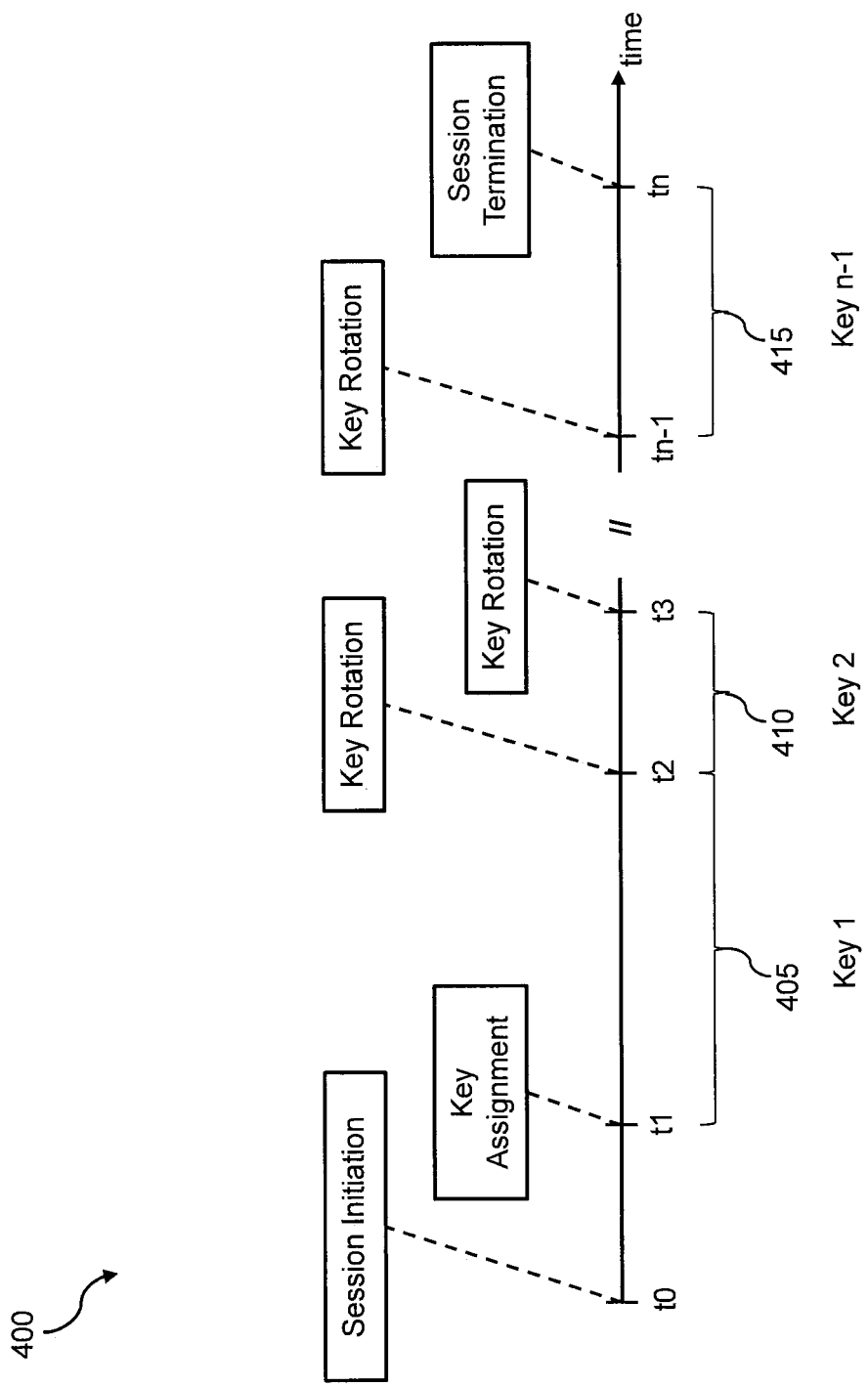
FIG. 4 illustrates a timeline associated with an encrypted communication session according to an embodiment of the present disclosure.

FIG. 4 illustrates a timeline 400 associated with an example encrypted communication session. The horizontal axis of the timeline 400 represents a time dimension during the encrypted communication session. The timeline 400 begins at time t0 where the session is initiated. As discussed above, the encrypted communication session may be initiated by one of the computer device transmitting a signal (e.g., an HTTPS request) to another computer device. The two computer devices (e.g., the web server 134 and the user device 110) may then negotiate the encryption algorithm and the key rotating scheme for use in the encrypted communication session. At time t1, the two computer devices have generated the initial encryption keys (e.g., the initial server encryption key and the initial client encryption key). As discussed above, each of the initial encryption keys may include an IV value and a key value (or just a key value).

After the time t1, the web server 134 and the UI application 112 may begin encrypting records using their corresponding encryption keys and transmitting the encrypted records to each other. In some embodiments, the traffic inspection module 132 and the traffic inspection module 116 may store the encrypted records being transmitted and their associated timestamp in the session files 235 and 245, respectively. In some of these embodiments, the traffic inspection module 132 and the traffic inspection module 116 may also store associated information such as the sender and the recipient of the record in the session file (e.g., as the metadata of the encrypted record).

Upon receiving each encrypted record, the secure communication module 206 may decrypt the encrypted record using the initial client encryption key, and may pass the decrypted record to other modules of the web server 134 for further processing. For example, the secure communication module 206 may pass the decrypted record to the content generation module 204 to generate additional content for the UI application 112. The traffic inspection module 132 may obtain each encrypted record and store encrypted record along with a timestamp associated with the record in the session file 235. The timestamp may be obtained from information that the TCP/IP layer provides while receiving the data packets included in the record. Thus, the timestamp may be indicative of a particular time and/or date that a packet was communicated; the timestamp may also include a packet number (e.g. a sequence number) indicative of a relative time for a communication session, where an earlier packet number has occurred earlier in the session than a later packet number, according to various embodiments.

Similarly, upon receiving each encrypted record, the secure communication module 224 may decrypt the encrypted record using the initial server encryption key, and may pass the decrypted record to the UI application 112 for further processing or display. The traffic inspection module 116 may obtain each encrypted record and store encrypted record along with a timestamp associated with the record in the session file 235.

During the encrypted communication session, the process 300 monitors (at step 320) the communication between the two computer devices. For example, the secure communication modules 206 and 224 and/or the traffic inspection modules 132 and 116 may monitor the decrypted records being communicated between the web server 134 and the UI application 112. The process 300 determines (at step 325) whether the encrypted communication session is terminated. The process 300 then ends if it is determined (at step 325) that the encrypted communication session is terminated. For example, if it is detected that the UI application 112 transmits a session termination request (e.g., a log out request, a termination of the UI application 112 by the user, etc.), the secure communication modules 206 and 224 may terminate the encrypted communication session. Furthermore, the traffic inspection module 132 may save the key index 230 and the session file 235 (e.g., in the database 210). The traffic inspection module 132 may also associate the key index 230 with the session file 235 (e.g., assign the same session identifier to the key index 230 and the session file 235, etc.) such that when the traffic inspection module 132 retrieves/accesses the session file 235, the key index 230 is also retrieved/accessed. Similarly, the traffic inspection module 116 may save the key index 240 and the session file 245 (e.g., on the user device 110). The traffic inspection module 132 may also associate the key index 240 with the session file 245 such that when the traffic inspection module 116 retrieves/accesses the session file 245, the key index 240 is also retrieved/accessed.

On the other hand, if it is determined (at step 325) that the session is not terminated, the process 300 proceeds to determine (at step 330) whether there is a key update event. If it is determined that there is no key update event, the process 300 reverts back to step 320 to continue to monitor the communication (the records) transmitted between the two computer devices.

On the other hand, if it is determined that there is a key update event, the process 300 generates (at step 335) a new encryption key based on the previous encryption key, and updates (at step 340) the key index with the new encryption key and a timestamp associated with the key update event. For example, a key update event can be determined based on one or more pre-determined criteria, such as the amount of time passed since the generation of the current encryption key or the number of records (or the amount of data) being encrypted and transmitted. As such, when the secure communication module 206 determines that a pre-determined amount of time has passed since the generation of the current encryption key and/or that the number of records (or the amount of data) being encrypted using the current encryption key has passed a predetermined threshold, the secure communication module 206 may generate a new key and transmit a "key update message" to the UI application 112.

The secure communication module 206 may generate the new server encryption key using the negotiated key rotation scheme. As discussed above, the key rotation scheme may include an algorithm or a mathematical computation that generates a new encryption key based on another encryption key (e.g., a current encryption key) such that the same encryption key is produced when the same current encryption key is provided to the key rotation scheme. Thus, the secure communication module 206 may generate the new server encryption key by providing the key rotation scheme with the current server encryption key (e.g., the initial server encryption key). In the embodiments where the previous encryption key includes both an IV value and a key value, the secure communication module 206 may generate a new IV value and a new key value during a key update event. In some embodiments, the traffic inspection module 132, upon detecting the key update event, may obtain the newly generated server encryption key from the secure communication module 206 and store the newly generated server encryption key, along with a timestamp associated with the key update event (e.g., a timestamp associated with the "key update message" transmitted to the UI application 112), in the key index 230. The secure communication module 206 may encrypt any new records generated by the web server 134 with the new server encryption key and transmit the encrypted record to the UI application 112.

The secure communication module 224 and/or the traffic inspection module 116 may also monitor the communication between the web server 145 and the UI application 112. Upon receiving the "key update message" from the web server 134, the secure communication module 224 may independently generate the new server encryption key using the key rotation algorithm negotiated with the web server 134 during the initial exchange. For example, the secure communication module 224 may provide the key rotation algorithm with the current server encryption key (e.g., the initial server encryption key) to generate the new server encryption key). In the embodiments where the previous encryption key includes both an IV value and a key value, the secure communication module 224 may generate a new IV value and a new key value during a key update event. Thus, the newly generated encryption key does not need to be communicated between the web server 134 and the UI application 112. The secure communication module 224 may begin using the new server encryption key to decrypt incoming encrypted records from the web server. Furthermore, the traffic inspection module 116 may also store the new server encryption key and a timestamp associated with the received "key update message" in the key index 240.

It has been contemplated that the secure communication module 224 of the UI application 112 may also determine a key update event based on the same criteria used by the secure communication module 206, and may then generate a new client encryption key using the technique described above based on the current client encryption key. The secure communication module 206 may also send a "key update message" upon detecting the key update event. Similarly, the secure communication module 206 may independently generate a new client encryption key based on the initial client encryption key using the techniques described above, upon receiving the "key update message" from the UI application 112. The traffic inspection modules 132 and 116 may also store the new client encryption keys in the key indexes 230 and 240, respectively.

The key update for the web server 134 and the UI application 112 may be performed synchronously or asynchronously. In a synchronous key update, both of the server encryption key and the client encryption key are updated at the same time, in response to transmitting or receiving the "key update message." As such, upon detecting the key update event by the secure communication module 206, both of the secure communication module 206 and the secure communication module 224 may generate a new server encryption key and a new client encryption key, and communicate records using the new keys. In an asynchronous key update, only the server encryption key or the client encryption key is updated at a time, according to various embodiments.

After generating a new encryption key and updating the key index, the process 300 reverts back to step 320 to continue to monitor the communication between the two computer devices. The process 300 may continue to detect key update events, generate new keys, and update the key index until the encrypted session is terminated.

Referring to FIG. 4, after the time t1, the web server 134 and the UI application 112 may use the initial server encryption key and the initial client encryption key (Key 1) to communicate with each other during the time period 405, until a key update event is detected at time t2. At the time t2, either or both of the secure communication module 206 and the secure communication module 224 detect a key update event and initiate the key update process. For example, the secure communication module 206 may generate a new server encryption key and send a "key update message" to the UI application 112. The secure communication module 224 may then independently generate the new server encryption key. In a synchronous update, the secure communication module 206 and the secure communication module 224 may also independently generate a new client encryption key at the time t2. Then, during the period of time 410, the web server 134 and the UI application 112 may use the encryption keys (Key 2) to communicate with each other until another key update event is detected at time t3. Similarly, the web server 134 and the UI application 112 may use the encryption keys (Key n−1, generated at time tn−1) to communicate with each other during the time period 415. At time tn, it is detected that the encrypted communication session is terminated. The traffic inspection modules 132 and 116 may store the key indexes 230 and 240, and the session files 235 and 245, respectively, for subsequent access and/or inspection.

FIG. 5 illustrates an example key index 500 generated by either the traffic inspection module 132 or the traffic inspection module 116. As shown, the key index 500 includes an initial client encryption key and an initial server encryption key. Both of the initial client encryption key and the initial server encryption key have an associated timestamp of Jan. 23, 2018 at 15:30. The initial client encryption key includes a key value of '0x123abc' and an initialization vector 'IV' value of '0x888def.' The initial server encryption key also has a key value of '0x333aac' and an IV value of '0x888def.'

In addition, the key index 500 also includes a second pair of client encryption key and server encryption key. As shown, the second pair of client encryption key and server encryption key is associated with a timestamp of Jan. 23, 2018 at 16:00. The second client encryption key has a 'key' value of '0x5201314 and an 'iv' value of '0x3388.' The second server key has a 'key' value of '0x22222' and an 'iv' value of '0x8888888.' In this example, the key index 500 indicates that the key update is performed synchronously as both of the client encryption key and the server encryption key are updated at the same time.

Figure 6:
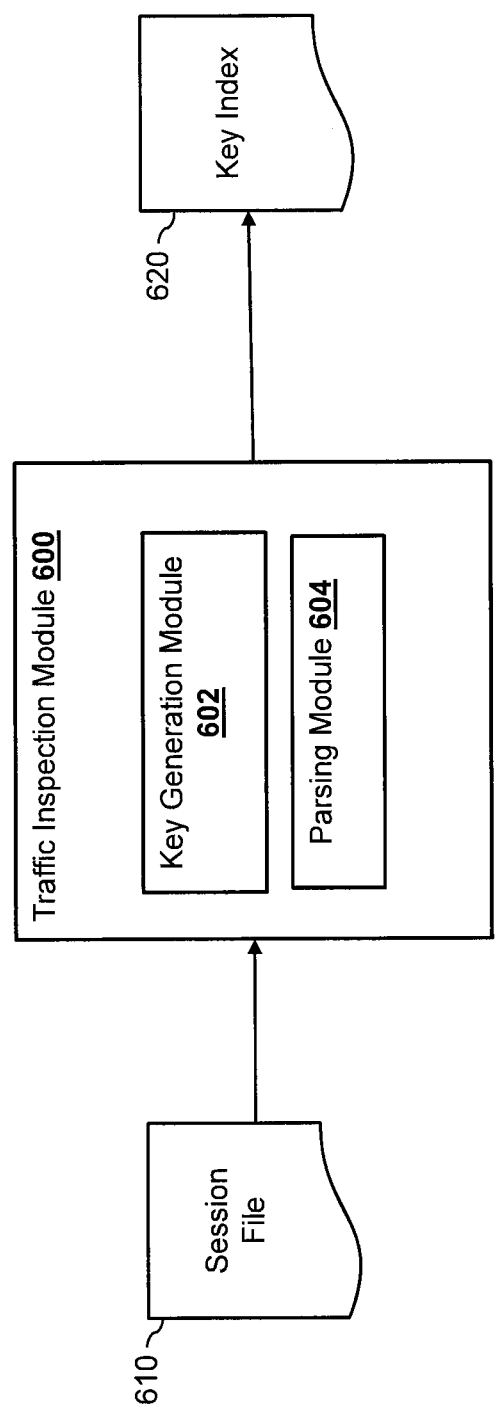
FIG. 6 is a block diagram illustrating a traffic inspection module according to an embodiment of the present disclosure.
Figure 7:
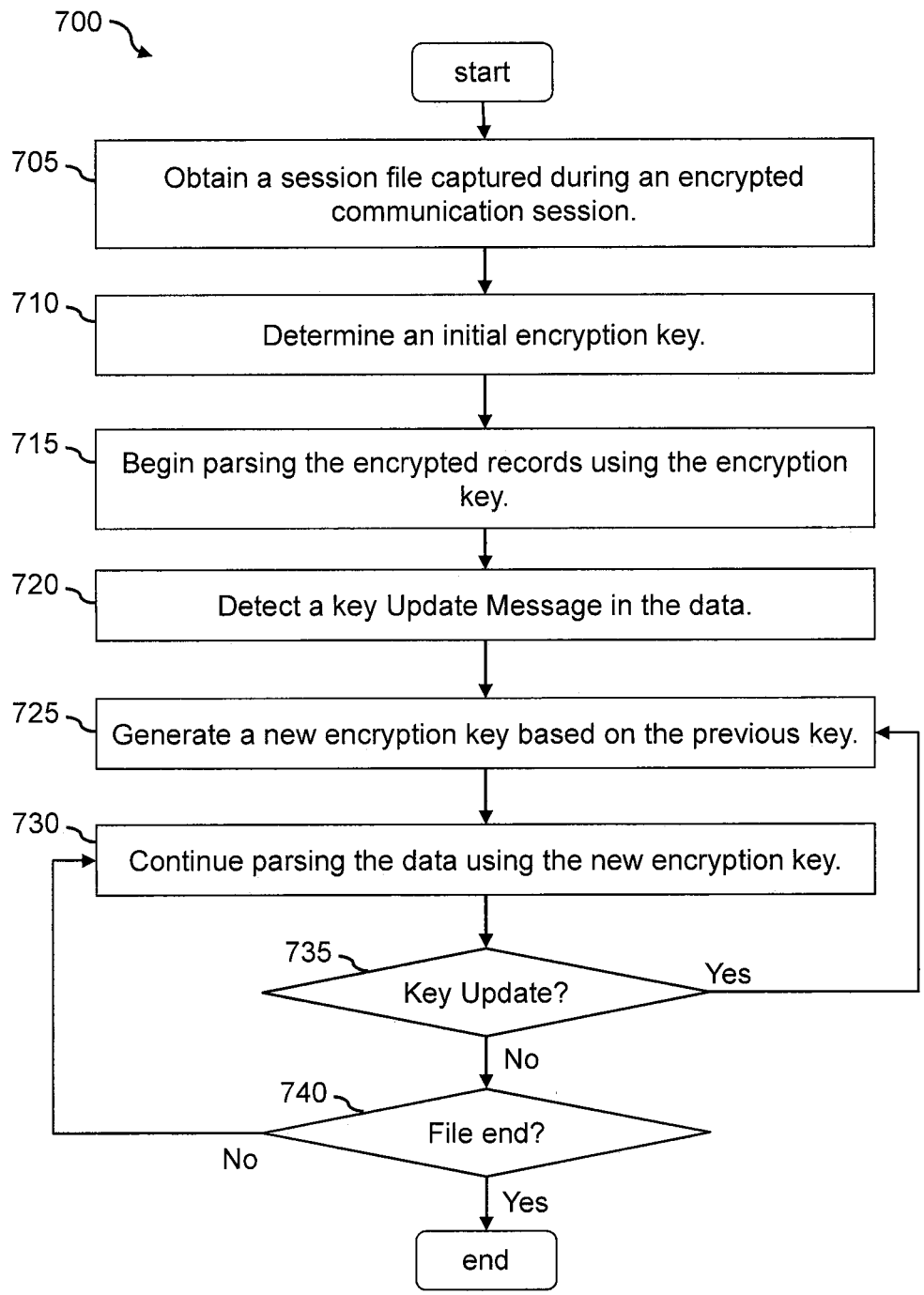
FIG. 7 is a flowchart showing a process relating to generating a key index under an offline approach according to an embodiment of the present disclosure.

The key index generation process that is performed under a live approach was described above by reference to FIGS. 2 and 3. FIG. 6 illustrates a block diagram of a traffic inspection module 600 configured to generate a key index under an offline approach according to various embodiments of the disclosure. The traffic inspection module 600 may be implemented as the traffic inspection module 132 of the service provider server 130 or the traffic inspection module 116 of the user device 110. As shown, the traffic inspection module 600 includes a key generation module 602 and a parsing module 604. FIG. 7 illustrates the process 700 for generating a key index under an offline approach according to various embodiments of the disclosure. In some embodiments, the process 700 may be performed by the traffic inspection module 600. The process 700 begins by obtaining (at step 705) a session file that was captured during an encrypted communication session. For example, the traffic inspection module 600 may obtain a session file 610. The session file 610 may correspond to the session file 235 generated at the web server 134, or the session file 245 generated at the UI application 112. The traffic inspection module 600 may begin to parse the session file 610. As discussed above, a session file, such as the session file 610, may include information related to the initial exchange (e.g., the handshake) for the encrypted communication session, and the encrypted records communicated between the web server 134 and the UI application 112 during the encrypted communication session. Since the initial exchange is not encrypted, the parsing module 604 may parse the information related to the initial exchange without any encryption key. As discussed above, the information related to the initial exchange may include a particular encryption algorithm and a particular key rotation scheme that were negotiated between two devices associated with the encrypted communication session, and the initial encryption key(s) used by the two devices.

The process 700 may then determine (at step 710) an initial encryption key for the encrypted communication session associated with the session file 610. For example, the parsing module 604 may extract the initial encryption key(s) from the information related to the initial exchange. As discussed above, each of the initial encryption keys may include an IV value and a key value. The traffic inspection module 600 may create a key index 620 and insert the initial encryption keys in the key index 620.

After determining the initial encryption keys, the process 700 begins (at step 715) parsing the encrypted records from the session file using the encryption keys. For example, the parsing module 604 may extract each encrypted record from the session file 610 and decrypt the encrypted record using the determined encryption keys. In the embodiments where the web server 134 uses a different encryption key than the UI application 112, the parsing module 604 may first determine whether the encrypted record is a record transmitted from the web server 134 or a record transmitted from the UI application 112, and may decrypt the record using the corresponding encryption key. The parsing module 604 may continue to decrypt the records until a "key update message" is detected from a decrypted record.

Thus, in step 720, the process 700 detects a "key update message" in the data extracted from the session file. Upon detecting the "key update message," the process 700 generates a new encryption key based on the previous encryption key. For example, when the parsing module 604 detects a "key update message" in the decrypted record, the key generation module 602 may use the key rotation scheme to generate a new encryption key. As discussed above, generating the new encryption key in some embodiments may comprise generating a new IV value and a new key value for the new encryption key. In a synchronous key update scheme, the key generation module 602 may compute a new server encryption key by providing the initial server encryption key to the key rotation scheme, and may compute new client encryption key by providing the initial client encryption key to the key rotation scheme. On the other hand, in an asynchronous key update scheme, the parsing module 604 may first determine the party that transmits the "key update message" and the key generation module 602 may update the encryption key for the transmitting party only. The traffic inspection module 600 may then update the key index 620 by inserting the new encryption key(s) and the timestamp associated with the "key update message" in the key index 620.

The process 700 may then continue (at step 730) to parse the subsequent encrypted records using the new encryption key(s). As the process 700 parses each encrypted record, the process 700 determines (at step 735) whether the record includes another "key update message." When it is determined that the record includes a "key update message," the process 700 reverts to step 725 to generate one or more new encryption keys based on the previous encryption keys, updates the key index, and continue parsing the subsequent record.

On the other hand, if it is determined that the record does not include a "key update message," the process 700 determines (at step 740) if the end of the file is reached. If the end of the file is reached, the process 700 ends. On the other hand, if it is determined that the end of the file is not reached, the process 700 reverts back to step 730 to continue parsing the subsequent records using the latest encryption key. After performing the process 700, the key index 620 generated by the traffic inspection module 600 may be similar to the key index 500 of FIG. 5.

Figure 8:
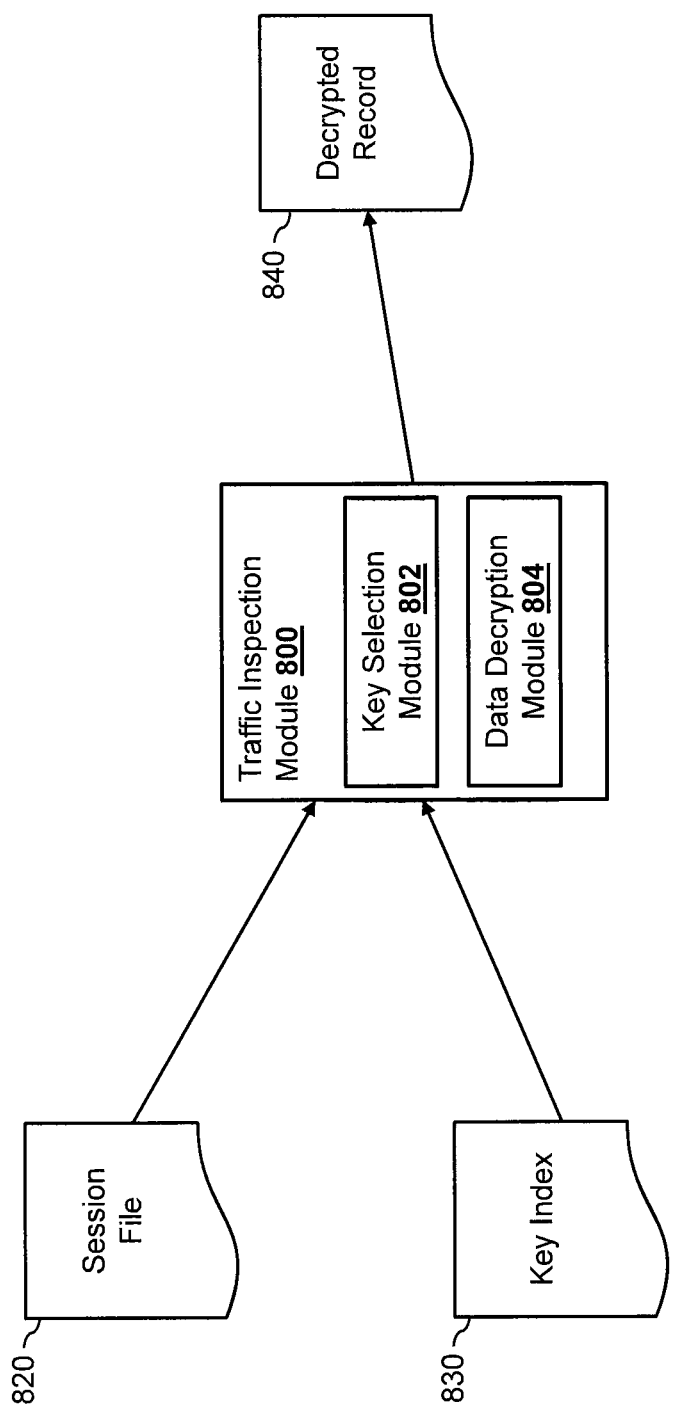
FIG. 8 is a block diagram illustrating a traffic inspection module according to an embodiment of the present disclosure.

Once the key index is generated, the key index may be used for fast random access and/or inspection of any records in an encrypted communication session. FIG. 8 illustrates a traffic inspection module 800 configured to provide fast random access and/or inspection of a record within an encrypted communication session according to various embodiments of the disclosure. As shown, the traffic inspection module includes a key selection module 802 and a data decryption module 804. In some embodiments, the traffic inspection module 800 may be implemented as the traffic inspection module 132 of the service provider server 130 and/or the traffic inspection module 116 of the user device 110. Furthermore, the functionalities of the traffic inspection modules 600 and 800 described herein with respect FIGS. 6 and 8 may be implemented within the traffic inspection module 132 of the service provider server 134 and/or the traffic inspection module 116 of the user device 110 such that the traffic inspection module 132 and the traffic inspection module 116 may generate key indexes under the live approach and/or under the offline approach, and may then use the key indexes to provide fast and random access of records.

Figure 9:
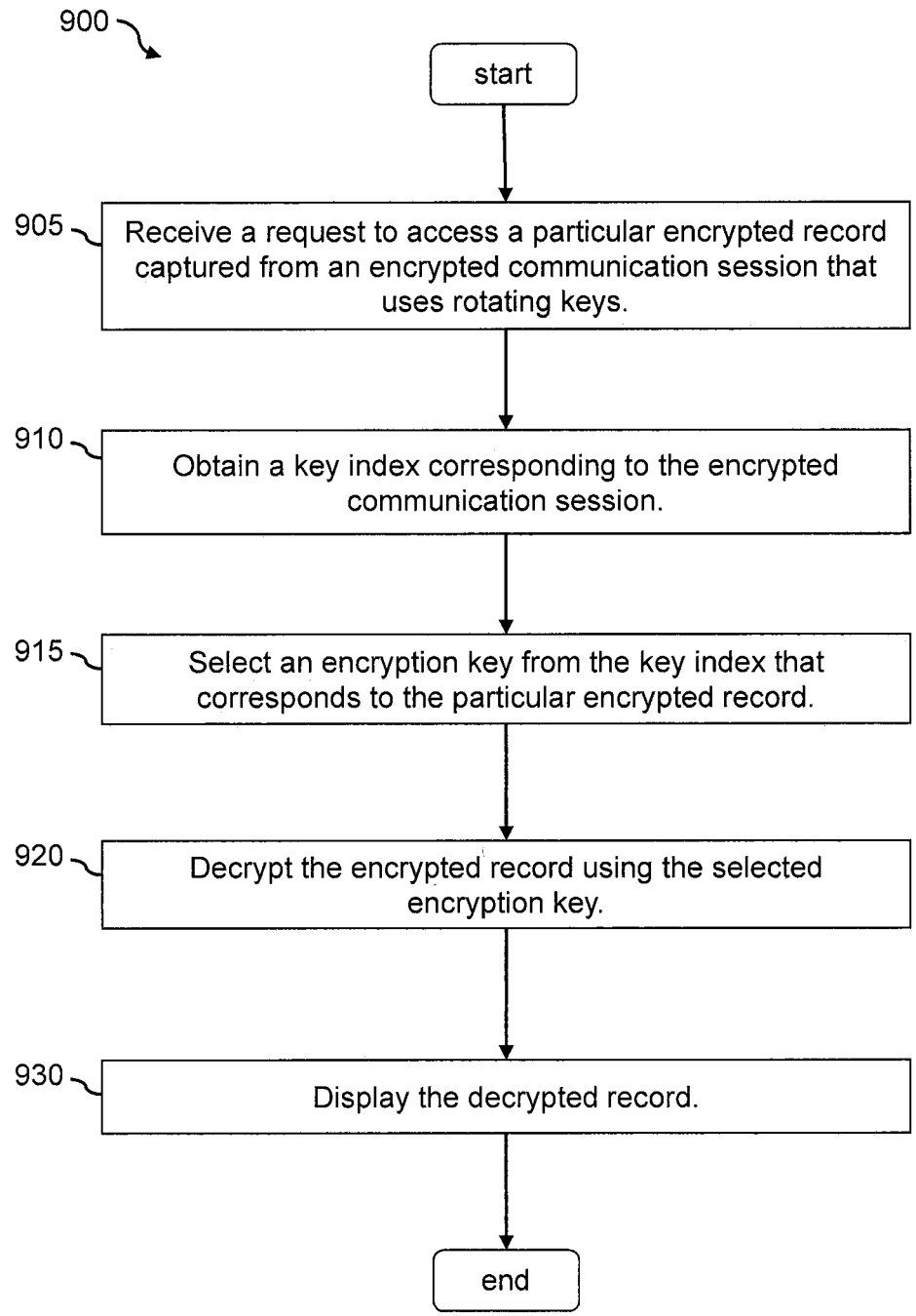
FIG. 9 is a flowchart showing a process relating to using a key index to provide fast random access of an encrypted record according to an embodiment of the present disclosure.

FIG. 9 illustrates a process 900 for using the generated key index to provide fast and random access and/or inspection of records within an encrypted communication session according to one embodiment of the disclosure. In some embodiments, the process 900 may be performed by the traffic inspection module 800. The process 900 begins by receiving (at step 905) a request to access a particular encrypted record captured from an encrypted communication session. For example, the traffic inspection module 800 may receive a request from the web server 134 and/or the service application 138 of the service provider server 130. In another example, the request may be received from an external device, such as the user device 110 or the merchant server 120, over the network 160. In some embodiments, the traffic inspection module 800 may provide a user interface to enable a user of the traffic inspection module to submit such a request.

The request may include information that identifies a particular encrypted communication session and also information that identifies a particular record within the encrypted communication session. For example, when each distinct encrypted communication session may be assigned with a session identifier (ID) (e.g., by the secure communication module 206 or the secure communication module 224 when the encrypted communication session is established). The session file and the key index generated from the communication during the encrypted communication session may then be associated with the session ID. As such, the request may include a session ID that uniquely identifies an encrypted communication session for access. In addition, the request may also include a timestamp (or a time period) for identifying one or more records within the encrypted communication session.

The process 900 then obtains (at step 910) a session file and a key index corresponding to the requested encrypted communication session. For example, the traffic inspection module 800 may retrieve the session file 820, among multiple stored session files, and the key index 830, among multiple stored key indexes, based on the session ID from the request.

Upon retrieving the session file and the key index, the process 900 selects (at step 915) an encryption key from the key index that corresponds to the requested encrypted record. For example, the key selection module 802 may retrieve, among the multiple stored encrypted records in the session file, an encrypted record corresponding to the timestamp from the request. The key selection module 802 may also determine from the session file a sender (e.g., the web server 134 or the UI application 112, etc.) of the retrieved encrypted record. Based on the timestamp indicated in the request and the sender of the encrypted record, key selection module 802 may retrieve the corresponding encryption key from the key index. In one example, the request asks for a record corresponding to a time of Jan. 23, 2018 15:45 from the encrypted communication session between the web server 134 and the UI application 112 that corresponds to the key index 500 of FIG. 5. The key selection module 802 may retrieve an encrypted record from the session file 820 that was transmitted at or around the time of Jan. 23, 2018 15:45. The key selection module 802 may determine, based on the metadata of the retrieved encrypted record, that the record was transmitted from the web server 134 to the UI application 112. Based on the sender of the record and the time, the key selection module 802 may select the server encryption key generated at the time of Jan. 23, 2018 15:30, comprising a 'key' value of '0x333aac' and an 'iv' value of '0x888def.'

In another example, the request asks for a record corresponding to a time of Jan. 23, 2018 16:02 from the encrypted communication session between the web server 134 and the UI application 112 that corresponds to the key index 500 of FIG. 5. The key selection module 802 may retrieve an encrypted record from the session file 820 that was transmitted at or around the time of Jan. 23, 2018 16:02. The key selection module 802 may determine, based on the metadata of the retrieved encrypted record, that the record was transmitted from the UI application 112 to the web server 134. Based on the sender of the record and the time, the key selection module 802 may select the client encryption key generated at the time of Jan. 23, 2018 16:00, comprising a 'key' value of '0x5201314' and an 'iv' value of '0x3388.'

After selecting the encryption key, the process 900 decrypts (at step 920) the encrypted record using the encryption key. For example, the data decryption module 804 may use the selected encryption key (which may include the corresponding key value and the corresponding IV value) to decrypt the retrieved encrypted record to generate decrypted record 840. At step 930, the process 900 displays the decrypted record. For example, the traffic inspection module 800 may display the decrypted record 840 on a display of the service provider server 130 or a display of the user device 110. In some embodiments, depending on the sender of the request, the traffic inspection module 800 may provide the decrypted record 840 to the sender of the request (e.g., the web server 134, the service application 138, etc.) for further processing. For example, when the request is part of an authentication process for a user, the decrypted record may be used by the web server 134 to authenticate the user.

The techniques described above provide fast random access/inspection of an encrypted record within an encrypted communication session. One of the technical effects is that it improves the speed and efficiency by which the encrypted record can be accessed/inspected. Conventionally, when the records within an encrypted communication session were encrypted using rotating keys, one has to parse the session file from the beginning and through the multiple encrypted records to determine the proper encryption key for decrypting the requested record, which can be time consuming and computationally intensive. Furthermore, the time used to access a record using a conventional method may vary, as it may take substantially longer time to access a record closer to the end of the session than a record closer to the beginning of the session. On the other hand, using the techniques described here, by generating the key index (either under the live approach or the offline approach), any record within an encrypted communication session may be accessed quickly and at a constant time.

Furthermore, while the example encrypted communication session described above is between a client device and a web server, it has been contemplated that the record inspection techniques can be applied to different use cases and the encrypted communication session can be established between different types of devices without departing the spirit of the disclosure. For example, the encrypted communication session may be established between a user device and a developer machine (having software development applications) for developing software applications. In another example, the encrypted communication session may be established between a merchant server and a software code repository server. In yet another example, the encrypted communication session may also be established between a service provider server and a software code deployment server.

Figure 10:
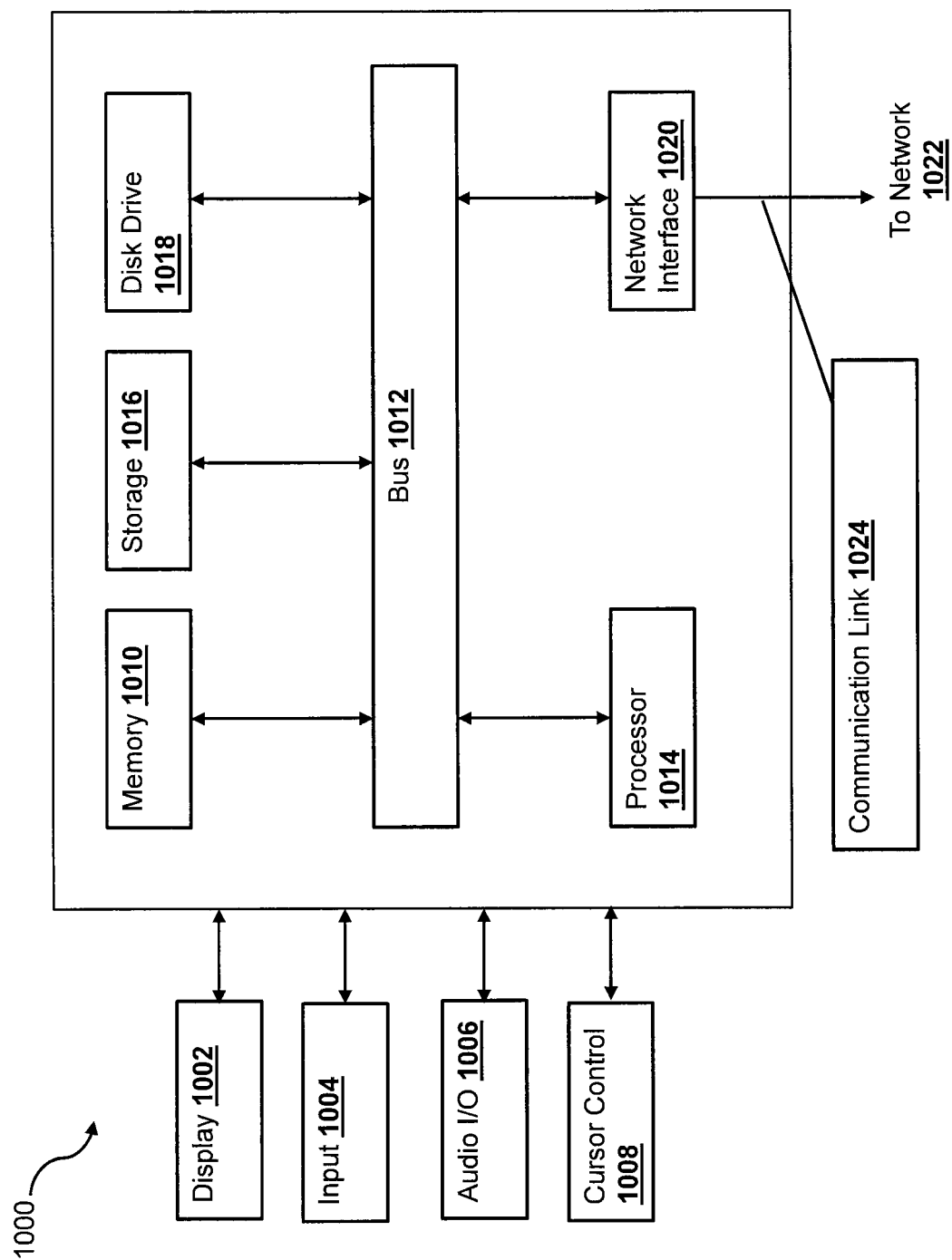
FIG. 10 is a block diagram of a system for implementing a device according to an embodiment of the present disclosure.

FIG. 10 is a block diagram of a computer system 1000 suitable for implementing one or more embodiments of the present disclosure, including the service provider server 130, the merchant server 120, and the user device 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, and 130 may be implemented as the computer system 1000 in a manner as follows.

The computer system 1000 includes a bus 1012 or other communication mechanism for communicating information data, signals, and information between various components of the computer system 1000. The components include an input/output (I/O) component 1004 that processes a user (i.e., sender, recipient, service provider) action, such as selecting keys from a keypad/keyboard, selecting one or more buttons or links, etc., and sends a corresponding signal to the bus 1012. The I/O component 1004 may also include an output component, such as a display 1002 and a cursor control 1008 (such as a keyboard, keypad, mouse, etc.). The display 1002 may be configured to present a login page for logging into a user account or a checkout page for purchasing an item from a merchant. An optional audio input/output component 1006 may also be included to allow a user to use voice for inputting information by converting audio signals. The audio I/O component 1006 may allow the user to hear audio. A transceiver or network interface 1020 transmits and receives signals between the computer system 1000 and other devices, such as another user device, a merchant server, or a service provider server via network 1022. In one embodiment, the transmission is wireless, although other transmission mediums and methods may also be suitable. A processor 1014, which can be a micro-controller, digital signal processor (DSP), or other processing component, processes these various signals, such as for display on the computer system 1000 or transmission to other devices via a communication link 1024. The processor 1014 may also control transmission of information, such as cookies or IP addresses, to other devices.

The components of the computer system 1000 also include a system memory component 1010 (e.g., RAM), a static storage component 1016 (e.g., ROM), and/or a disk drive 1018 (e.g., a solid state drive, a hard drive). The computer system 1000 performs specific operations by the processor 1014 and other components by executing one or more sequences of instructions contained in the system memory component 1010. For example, the processor 1014 can perform the risk analysis functionalities described herein according to the processes 300, 700, and 900.

Logic may be encoded in a computer readable medium, which may refer to any medium that participates in providing instructions to the processor 1014 for execution. Such a medium may take many forms, including but not limited to, non-volatile media, volatile media, and transmission media. In various implementations, non-volatile media includes optical or magnetic disks, volatile media includes dynamic memory, such as the system memory component 1010, and transmission media includes coaxial cables, copper wire, and fiber optics, including wires that comprise the bus 1012. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1000. In various other embodiments of the present disclosure, a plurality of computer systems 1000 coupled by the communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
   detecting, by a first computer system, an indication of an encrypted communication session being initiated between the first computer system and a second computer system over a network;
   in response to the detecting, monitoring, by the first computer system, data exchanged between the first computer system and the second computer system during an initial handshake for the encrypted communication session;
   obtaining, by the first computer system, first parameters associated with a first encryption key used to encrypt at least a first portion of a communication between the first computer system and the second computer system during the encrypted communication session based on the monitoring;
   generating, by the first computer system, the first encryption key based on the first parameters;
   updating a key index associated with the encrypted communication session with the first encryption key;
   obtaining, by the first computer system, first encrypted messages transmitted during the encrypted communication session between the first computer system and the second computer system;
   storing, by the first computer system, the first encrypted messages in association with the key index;
   decrypting, by the first computer system, the first encrypted messages using the first encryption key that generates first decrypted messages;
   determining that a key update message has been communicated between the first computer system and the second computer system based on the first decrypted messages;
   in response to the determining that the key update message has been communicated, obtaining, by the first computer system, second parameters associated with a second encryption key and a first timestamp indicating an instance in time at which the key update message was communicated based on the first decrypted messages, the second encryption key being used to encrypt at least a second portion of the communication between the first computer system and the second computer system subsequent to the instance in time indicated by the first timestamp during the encrypted communication session;
   generating, by the first computer system, the second encryption key based on the second parameters;
   updating, by the first computer system, the key index with the second encryption key and the first timestamp;
   storing, by the first computer system, second encrypted messages transmitted between the first computer system and the second computer system subsequent to the instance in time indicated by the first timestamp in association with the key index;
   subsequent to a termination of the encrypted communication session, receiving, by the first computer system, a request for accessing a communication record that is transmitted between the first computer system and the second computer system during the encrypted communication session;
   retrieving, by the first computer system, an encrypted record comprising at least one of the first encrypted message or the second encrypted message associated with the encrypted communication session based on the request;
   selecting, by the first computer system among a plurality of encryption keys comprising the first and second encryption keys stored in the key index, a particular encryption key based on a relationship between the first timestamp and a second timestamp associated with the encrypted record;
   decrypting, by the first computer system, the encrypted record using the particular encryption key; and providing, by the first computer system, the decrypted record as a response to the request.

2. The method of claim 1, wherein the second encryption key is generated further based on the first encryption key.

3. The method of claim 1, wherein the first encrypted messages and the second encrypted messages are stored as separate records in the key index.

4. The method of claim 1, wherein the particular encryption key is selected among the plurality of encryption keys further based on an identity of a sender of the encrypted record.

5. The method of claim 1, wherein the indication comprises a request for a webpage associated with the first computer system.

6. The method of claim 1, further comprising:
detecting the termination of the encrypted communication session; and
in response to detecting the termination of the encrypted communication session, aborting the updating of the key index.

7. The method of claim 1, wherein the first computer system comprises a web server.

8. The method of claim 1, wherein the second computer system comprises a web browser.

9. The method of claim 1, wherein the first encryption key is used by the first computer system to encrypt data being transmitted to the second computer system, and wherein the method further comprises:
obtaining third parameters associated with a third encryption key used by the second computer system to encrypt data being transmitted to the first computer system prior to the first timestamp based on the monitoring; and
generating a third encryption key based on the third parameters, wherein the decrypting the first encrypted messages is further based on the third encryption key.

10. A system comprising:
a non-transitory memory; and
one or more hardware processors coupled to the non-transitory memory and configured to read instructions from the non-transitory memory to cause the system to perform operations comprising:
obtaining data captured during an encrypted communication session with a computer device, wherein the data comprises encrypted records communicated between the system and the computer device;
parsing a first portion of the data corresponding to a handshake exchange between the system and the computer device;
determining first parameters associated with a first encryption key based on the parsing the first portion of the data;
generating the first encryption key based on the first parameters;
decrypting a second portion of the data comprising a first set of the encrypted records using the first encryption key that generates a first set of decrypted records;
detecting a key update message within the first set of decrypted records;
determining second parameters associated with a second encryption key based on the first set of decrypted records;
generating the second encryption key based at least in part on the first encryption key and the second parameters;
generating a key index for the encrypted communication session based on the first encryption key, the second encryption key, and a first timestamp associated with the key update message;
subsequent to the generating the key index, receiving a request for accessing a communication record that is transmitted between the first computer system and the second computer system during the encrypted communication session;
retrieving an encrypted record from the data based on the request;
selecting, among a plurality of encryption keys comprising the first and second encryption keys stored in the key index, a particular encryption key based on a relationship between the first timestamp and a second timestamp associated with the encrypted record;
decrypting the encrypted record using the particular encryption key; and
providing the decrypted record as a response to the request.

11. The system of claim 10, wherein the operations further comprise determining that the key update message is associated with the first timestamp.

12. The system of claim 10, wherein the operations further comprise decrypting a third portion of the data comprising a second set of the encrypted records using the second encryption key to generate a second set of decrypted records.

13. The system of claim 10, wherein the particular encryption key is selected among the plurality of encryption keys further based on an identity of a sender of the encrypted record.

14. The system of claim 12, wherein the operations further comprise detecting a second key update message within the second set of decrypted records.

15. A non-transitory machine-readable medium having stored thereon machine-readable instructions executable to cause a machine to perform operations comprising:
detecting, by a first computer system, an indication of an encrypted communication session being initiated between the first computer system and a second computer system over a network;
in response to the detecting, monitoring, by the first computer system, data exchanged during a handshake between the first computer system and the second computer system for the encrypted communication session;
determining, by the first computer system, first parameters associated with a first encryption key based on the monitoring, wherein the first encryption key is used to encrypt a first portion of a communication between the first computer system and the second computer system during the encrypted communication session;
generating, by the first computer system, the first encryption key based on the first parameters;
updating a key index associated with the encrypted communication session with the first encryption key;
obtaining, by the first computer system, first encrypted messages transmitted between the first computer system and the second computer system;
storing, by the first computer system, the first encrypted messages in association with the key index;
decrypting, by the first computer system, the first encrypted messages using the first encryption key to generate first decrypted messages;
determining, by the first computer system, that a key update message has been communicated between the first computer system and the second computer system based on the first decrypted messages;

determining, by the first computer system, a first timestamp indicating an instance in time at which the key update message was communicated;

obtaining, by the first computer system, second parameters associated with a second encryption key used to encrypt a second portion of the communication between the first computer system and the second computer system subsequent to the instance in time indicated by the first timestamp during the encrypted communication session;

generating, by the first computer system, the second encryption key based on the second parameters;

updating, by the first computer system for the encrypted communication session, the key index with the second encryption key and the first timestamp; and storing, by the first computer system, second encrypted messages transmitted between the first computer system and the second computer system subsequent to the instance in time indicated by the first timestamp in association with the key index.

16. The non-transitory machine-readable medium of claim 15, wherein the data comprise: clear-text data captured during an initialization of the encrypted communication session.

17. The non-transitory machine-readable medium of claim 15, wherein the encrypted communication session is a web session, and wherein the first computer system comprises a web server.

18. The non-transitory machine-readable medium of claim 16, wherein the second encryption key is generated further based on the first encryption key.

19. The non-transitory machine-readable medium of claim 15, wherein the operations further comprise:

decrypting, by the first computer system, the second encrypted messages using the second encryption key to generate second decrypted messages;

determining, by the first computer system, that a second key update message has been communicated between the first computer system and the second computer system based on the second decrypted messages;

determining, by the first computer system, a second timestamp indicating a second instance in time at which the second key update message was communicated;

obtaining, by the first computer system, third parameters associated with a third encryption key used to encrypt a third portion of the communication communicated between the first computer system and the second computer system from the second decrypted messages;

generating, by the first computer system, the third encryption key based on the third parameters; and updating the key index based on the third encryption key and the second timestamp.

20. The non-transitory machine-readable medium of claim 15, wherein the operations further comprise:

detecting a termination of the encrypted communication session; and in response to detecting the termination of the encrypted communication session, storing the key index in association with the encrypted communication session.

* * * * *

UNITED STATES PATENT AND TRADEMARK OFFICE
CERTIFICATE OF CORRECTION

PATENT NO. : 10,979,404 B2
APPLICATION NO. : 15/940919
DATED : April 13, 2021
INVENTOR(S) : Hubert Le Van Gong and Michael Shiwen Thang Page 1 of 1

It is certified that error appears in the above-identified patent and that said Letters Patent is hereby corrected as shown below:

In the Claims

Please correct Column 24, Line 2 as follows:
tion session based at least in part on the first encryption key, the Signed and Sealed this
First Day of June, 2021

Drew Hirshfeld
*Performing the Functions and Duties of the*
*Under Secretary of Commerce for Intellectual Property and*
*Director of the United States Patent and Trademark Office*